Dec. 29, 1942.     W. STROBRIDGE     2,306,473
GARMENT PRESS
Filed Oct. 9, 1940     2 Sheets-Sheet 2

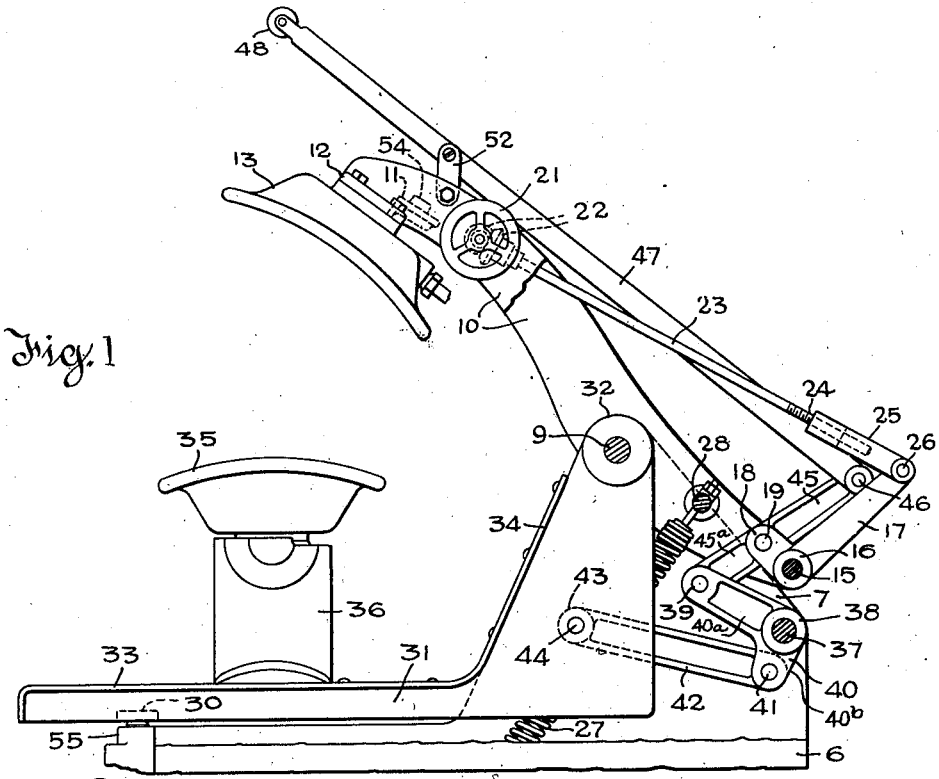

Inventor
William Strobridge
By
Dodge and Sons
Attorneys

Patented Dec. 29, 1942

2,306,473

UNITED STATES PATENT OFFICE 2,306,473

GARMENT PRESS

William Strobridge, Syracuse, N. Y., assignor to United States Hoffman Machinery Corporation, New York, N. Y., a corporation of Delaware Application October 9, 1940, Serial No. 360,494

7 Claims. (Cl. 38—25)

This invention relates to garment presses and particularly to an improved form of manually operable press.

The conventional type of garment press comprises a buck on which the goods to be pressed are supported and a head for pressing the goods against the buck. Various arrangements for heating the coacting elements, or one of them, and for the development of steam sprays and vacuum ejector effects are known. As to these features no novelty is here claimed, and it will suffice to say that the press is capable of use with these features or such of them as may be desired.

The purpose of the invention is to produce a simple actuating linkage. An important characteristic of the invention is that the buck is mounted on a lever or swinging platform instead of being mounted fixedly on the base as is the usual practice. The head is mounted on a lever as usual. According to the preferred construction the head carrying lever and the buck carrying lever or platform are mounted on a common fulcrum supported by the base. In the closing movement of the press the head descends and the buck rises but at a slower rate than the head.

The reaction between the head and buck is produced by two interconnected toggle linkages, an intermediate member of the two linkages being supported on the base and the linkages being so contrived as to produce the desired movements of the head carrying lever and the buck carrying lever. In this way the total weight of the machine is reduced because it is unnecessary to apply a counter-balancing mass to the head lever as has heretofore been common practice, and the total motion of the actuating handle for a given relative movement of head and buck is reduced.

Another feature of the invention is that the hand lever which operates the press is mounted on one of the two pressure developing levers, the preferred arrangement being to mount it on the head carrying lever. This hand lever is associated with the toggle linkage in such a way as to produce a third toggle lock when the press is closed. Thus the hand lever which closes the press swings in a path so nearly an arc concentric with the head lever that the opening and closing movements are accomplished by relatively reverse unidirectional pulls on the actuating handle.

That being the general principle of the invention, a preferred embodiment will now be described by reference to the accompanying drawings, in which:

Figure 1 is a side view of the pressing elements in their open position, certain portions of the machine being broken away. In this view only the upper portion of the supporting base is shown. This base may take any desired form and is not illustrated because it is not a feature of the invention.

Fig. 2 is a similar side view showing the press closed.

Figure 3:
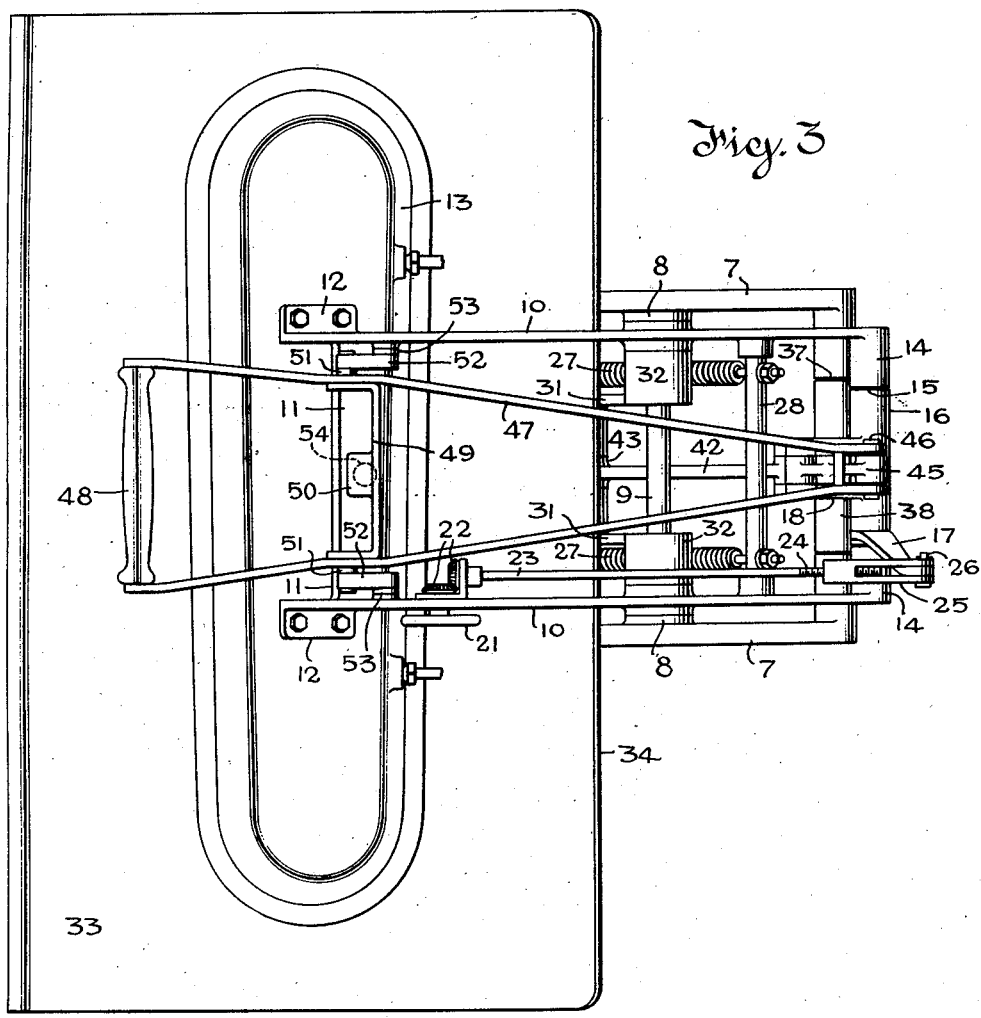
Fig. 3 is a plan view of the press in the position of Fig. 2.

In the drawings the base of the machine is indicated generally by the numeral 6 and carries two spaced upstanding yokes 7. Near the top of the member 7 are bosses 8 in which is mounted a cross shaft 9. The cross shaft 9 is the common fulcrum for the head lever and for the frame, which carries the buck and is in effect a second lever.

The head lever comprises two spaced members 10 connected at their forward end by a cross yoke 11. The yoke has pads 12 which are bolted to the pressing head generally indicated by the numeral 13. This head may assume any preferred form, a form common in the pressing art being clearly shown in the drawings.

At the rear ends of the side members 10 are bosses 14 which are connected by a cross shaft 15 fixed therein. Swiveled on the cross shaft 15 is the elongated hub 16 of a bell crank having a longer upstanding arm 17 and a shorter arm 18 nearly at right angles thereto. The arm 18 offers an adjustable connection between the head carrying lever and a toggle linkage hereinafter described, and carries a fulcrum pin 19 to which the linkage is connected as hereinafter described.

The position of the bell crank 17 is adjusted by turning the wheel 21 rotatably mounted in a portion of one of the frames 10. To effect this the wheel 21, through the bevel gears 22, rotates a shaft 23 which is threaded at 24 into the clevis 25. The clevis 25 is pinned at 26 to the upper end of the arm 27 and the shaft is held against axial motion by one of the bevel gears. Thus rotation of the wheel 21 adjusts the position of the pivot 19 in a direction transverse to the head carrying lever.

To develop an opening tendency on the press, use is made of springs 27 which extend between a portion of the base 6 and a cross bar 28 extending between the arms 10.

The frame which carries the buck comprises a pair of spaced frame members 31 having head portions 32 which are journaled on the cross shaft 9 between the side members 10 of the head lever (see Fig. 3). Their form is clearly shown in Figs.

1 and 2 and they sustain a table plate 33 bent at the rear to form a guard 34 which protects the goods to be pressed from contact with the lever mechanism.

The buck 35 is carried on a pedestal 36 supported by the frame members 31. To develop the pressing stress between the head carrying lever and the buck carrying lever, both of which are fulcrumed on the shaft 9, use is made of a double toggle linkage, and to determine the position of the buck and head each relatively to the frame, one component of the double toggle linkage is fulcrumed on the frame. That linkage will now be described.

Extending between the members 7 is a cross shaft 37 on which is journaled the hub 38 of a bell crank 40 whose arms are at approximately right angles to each other, there being a long arm 40a carrying the pivot 39 and a shorter arm 40b carrying the pivot 41. Connected to the pivot 41 is a strut link 42 whose hub member 43 is journaled on a cross shaft 44 which is parallel with the shaft 9 and is carried at its ends in members 31 forming part of the buck carrying lever. A lever 45 journaled near its middle on the pin 19 has a lower arm 45a pinned at its lower end to the hinge pin 39 of the bell crank 40. Thus there are two main toggles, a head actuating toggle made up of the parts 40a, and 45a and a buck actuating toggle made up of the parts 40b, 42. Since the arms 40a, 40b are integral parts of the same bell crank 40, the two toggles operate in unison and, as shown, they are so arranged that they both move toward their straightened position at the same time, see Fig. 2.

The lever 45 extends upward beyond the pivot pin 19 and at 46 is hinged to the triangular yoke frame 47 whose forward end carries an actuating handle grip 48. About a third of the distance from the handle grip 48 to the pivot connection 46 there is a cross frame 49 which stiffens the triangular frame 47 at the point where it carries the trunnions or pivots 51 to which are pivoted the guide links 52. The guide links 52 are fulcrumed on trunnions or pivots 53 carried by the side members 10 forming the head lever.

The guide links 52, together with the triangular frame 47, form a third or locking toggle. In closed position an ear 50, carried by the cross frame 49, engages a buffer 54 fixed to the cross yoke 11 and limits the downward motion of the triangular frame 47 so that the toggle formed by the links 52 and the frame 47 moves just past center and locks.

At their free ends the members 31 are connected by a cross bar 30 and in the open position of the press the bar 30 rests on a buffer 55. The opening movement of the press is thus limited.

When the press is open the parts are in the position shown in Fig. 1. To close the press the operator grasps the handle 48 and draws it downward in a generally arcuate path. As he does so, the links 52 swing, causing the triangular frame 47 to move forward relatively to the head carrying lever and rotate the connected lever 45 in a counter-clockwise direction. This approximately straightens the toggle made up of the lower arm 45a of lever 45 and the upstanding arm 40a of the bell crank 40 and similarly straightens the toggle made up of the link 42 and the short arm 40b of the bell crank 40. Thus in the closed position of the press there is a thrust reaction between the pivot 19 on the head lever and the pivot 37 on the base, and a thrust reaction between the pivot 44 on the buck carrying frame and the pivot 37 on the base.

The rate of movement of the head carrying lever, and also the rate of movement of the buck carrying frame, are thus determined in relation to each other and to the frame. The fact that the shaft 37 is carried on the frame fixes, in conjunction with the proportions of the linkage, the ranges of motion of the head and of the buck. The heavy buck, in swinging through a relatively small angle, counter-balances the lighter head mechanism which swings through a substantially larger angle. This scheme of causing the buck to counter-balance the head permits the elimination of the extra weights commonly used for counter-balancing purposes and reduces the total weight to be handled so that the parts can be counter-balanced by springs such as springs 27. This is an important feature of the invention.

It will be observed that the path of the handle 48 is a curve compounded of the swinging movement of the lever about the fulcrum 9 and the swinging movement of the links 52 about the trunnions 53. However, the path of the handle 48 approximates the arcuate path of the head 13 and thus affords very easy manipulation, it being simply necessary to draw the handle downward to the front to close the press and force it upward and slightly to the rear to open the press. Use of the apparatus has demonstrated the fact that ample pressing force can be developed manually so that all foot levers, foot latches and power devices for actuating the press can be eliminated.

The location of the adjusting wheel 21 so that it is accessible to the operator as he stands at the front of the press is a convenient feature, precise adjustment of the linkage being important in any press operated manually.

While one embodiment of the invention has been described in considerable detail, other embodiments are possible within the scope of the claims. No necessary limitation to the specific structure described is implied.

I claim:

1. The combination of a support; a pair of levers pivotally mounted on said support; a buck carried by one of said levers; a coacting head carried by the other of said levers; a pair of toggle linkages interposed between said levers, said linkages including a two-armed lever whose respective arms form a part of each toggle linkage, said two-armed lever being pivoted on said support whereby the linkages operate in unison; and a third toggle linkage supported on one of the first named levers and connected with a link of said pair of toggle linkages to actuate both thereof, and cause the press to move between its open and closed positions.

2. The combination defined in claim 1 in which the head carrying lever tends to gravitate toward the buck, and the buck carrying lever tends to gravitate away from the head carrying lever, the pair of toggle linkages being so proportioned that their ranges of simultaneous motion are inversely proportioned to the masses of the parts moved thereby, whereby approximate neutralization of the effects of gravity is secured.

3. The combination defined in claim 1 in which the head carrying lever tends to gravitate toward the buck, and the buck carrying lever tends to gravitate away from the head carrying lever, the parts being so proportioned that the buck and its lever have greater mass than the head and its lever, and the pair of toggle linkages are so proportioned that travel of the head exceeds the concurrent travel of the buck in such degree as to secure approximate balance under the effect of gravity.

4. A garment press comprising a support; a head and a buck movable relatively to each other and each pivoted on said support; a pair of toggles one for actuating the head and the other for actuating the buck; a third toggle carried by the head connected to actuate both of said toggles simultaneously to bring the head and buck into pressing relation; and a handle for opening and closing the press, mounted on a member of the third toggle, the parts being so arranged that the path of the handle closely approximates the path of the head.

5. A garment press comprising a support; a head and a buck movable relatively to each other and each having a pivotal connection to said support; a pair of toggles one for actuating the head and the other for actuating the buck, said toggles having in common a double armed lever pivoted on said support; and means carried by said head for actuating said toggles in unison.

6. A garment press comprising a support; a head and a buck movable relatively to each other and each having a pivotal connection to said support; a pair of toggles one for actuating the head and the other for actuating the buck, said toggles having in common a double armed lever pivoted on said support; means carried by said head and pivoted to said toggles for actuating said toggles in unison to open or close the press; and press locking means actuated by movement of the toggle actuating means to press closing position.

7. A garment press comprising a support; a head and a buck movable relatively to each other and each having a pivotal connection to said support; a pair of toggles one for actuating the head and the other for actuating the buck, said toggles having in common a double armed lever pivoted on said support; means carried by said head and pivoted to said toggles for actuating said toggles in unison to open or close the press; and a third toggle means interposed between said head and the toggle actuating means for locking the press in closed position.

WILLIAM STROBRIDGE.